(No Model.)
A. W. HEINLY.
DISH WASHING MACHINE.
No. 481,027. Patented Aug. 16, 1892.
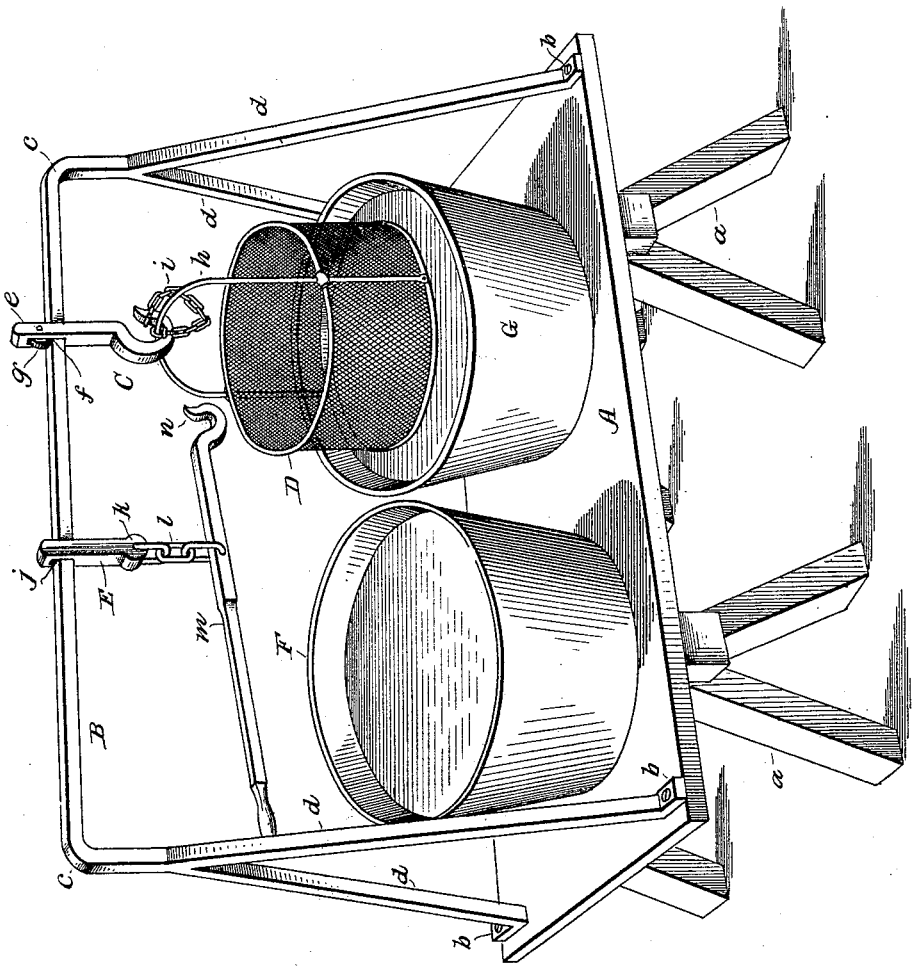
WITNESSES.
Victor J. Evans.
J. F. Beale.
INVENTOR.
Anderson W. Heinly.
by W. A. Redmond,
Atty.

UNITED STATES PATENT OFFICE.

ANDERSON W. HEINLY, OF DANVILLE, ILLINOIS.

DISH-WASHING MACHINE.

SPECIFICATION forming part of Letters Patent No. 481,027, dated August 16, 1892.

Application filed March 21, 1892. Serial No. 425,762. (No model.)

*To all whom it may concern:*

Be it known that I, ANDERSON W. HEINLY, a citizen of the United States, residing at Danville, in the county of Vermilion and State of Illinois, have invented certain new and useful Improvements in Dish-Washing Machines; and I do hereby declare the following to be a full, clear, and exact description of the invention, such as will enable others skilled in the art to which it appertains to make and use the same.

This invention relates to dish-washing machines, and has for its object to provide a very simple, comparatively inexpensive, and easily-operated machine for the purpose named, whereby the dishes may be thoroughly cleansed and afterward rinsed without removing the same from the dish holder or basket in which they are first placed for cleansing; and it consists in the parts and combinations of parts hereinafter fully described and claimed.

In the accompanying drawing, forming a part of this specification, is shown a perspective view of my improved machine.

A represent a wooden bench or table supported by legs $a$, on the upper surface or top of which at each end the ends $b$ of the divided supporting-frame B are bolted or otherwise secured. The frame B consists of an iron bar, which is bent downwardly at a suitable distance from each end at right angles, as at $c$, and said ends then divided at a short distance below the bends of the bar to form supporting-braces $d$, which diverge and extend down to the bench and are secured at each side thereof at the ends. This frame may be made in any desired manner—as, for instance, it may be formed of one single piece bent downwardly, as described, of sufficient thickness and width to permit of its being split at each end to form the supporting-braces $d$, or one of said braces at each end may be riveted or welded to the bar at the point where the other or corresponding brace is bent outwardly or laterally therefrom—the object being to secure a strong support for the horizontal or track portion of the bar which carries the basket of dishes and the lever for moving the same.

C represents a hook, the shank $e$ of which is slotted longitudinally, as at $f$, and carries a friction roller or wheel $g$, which is mounted therein. The slot $f$ is of such size as to readily receive the horizontal bar of the frame therein and its walls act as guides to prevent lateral or sidewise movement of the hook, and its roller $g$ is of such size as to fit the bar accurately. The upper surface of the bar and the periphery of the roller may be flat, or the roller may be grooved and the bar rounded on its upper surface to correspond.

D is a wire basket having the bail $h$ secured thereto in any desired manner. To the middle or center of the bail one end of a short iron chain $i$ is secured by a swivel-link, the other end of said chain being removably attached to the hook C by its end link.

E is a hanger having a slot $j$ at one end, adapted to fit slidably over or on the horizontal bar of the frame, and has an eye $k$ formed at its other end, to which is linked one end of a short chain $l$, the other end of said chain being secured at a suitable point to a lever $m$, having a hook $n$ formed at one end.

F represents the rinsing-tub, and G the washing-tub.

All the iron parts of the machine are preferably galvanized to prevent rusting.

The dishes to be washed are placed in the wire basket and the basket suspended by its bail from the hook C and the latter moved along the horizontal rod of the frame on its roller $g$ over the tub G, which has been partly filled with hot soapsuds. The lever $m$ is then moved or slid by its hanger into position to enable its hook $n$ to be inserted under the bail of the basket and lift the same off of the hook C and lower the basket with its contents into the scalding-hot suds contained in tub G, the chain $i$ being of such length as to prevent the basket touching the bottom of said tub, and the lever being released from the bail the basket is then swung or given a rotary motion in the hot suds, thereby, owing to the agitation of the suds, washing the dishes. The basket is then raised out of the hot suds and its bail caught on hook C by the lever $m$ and permitted to drain into the tub, and is then moved over the rinsing-tub F and lowered into the clean hot water contained therein and given a rotary or a vertical motion in the tub in order to remove the soapsuds from the dishes, after which the dishes are removed from the basket and permitted to dry, the hot dishes evaporating the water thereon, soon causing them to dry without being wiped.

Having thus described my invention, what I claim as new, and desire to secure by Letters Patent, is—

The combination, in a dish-washing machine, of a frame consisting of a horizontal bar bent downwardly at right angles at a suitable distance from its ends and said ends being divided longitudinally and extending divergingly downward, a hook having a slot in its shank, a roller mounted in said slot, a wire basket, a chain connecting said basket and said hook, and means adjustably mounted on said horizontal rod for moving said basket, substantially as described.

In testimony whereof I affix my signature in presence of two witnesses.

ANDERSON W. HEINLY.

Witnesses:
JOHN B. SAMUEL,
ERNEST X. LESEURE.